Sept. 1, 1925. 1,552,047
S. A. CRONE
EMERGENCY SAFETY SUPPORT FOR BRAKE BEAMS
Filed Dec. 20, 1924 2 Sheets-Sheet 1
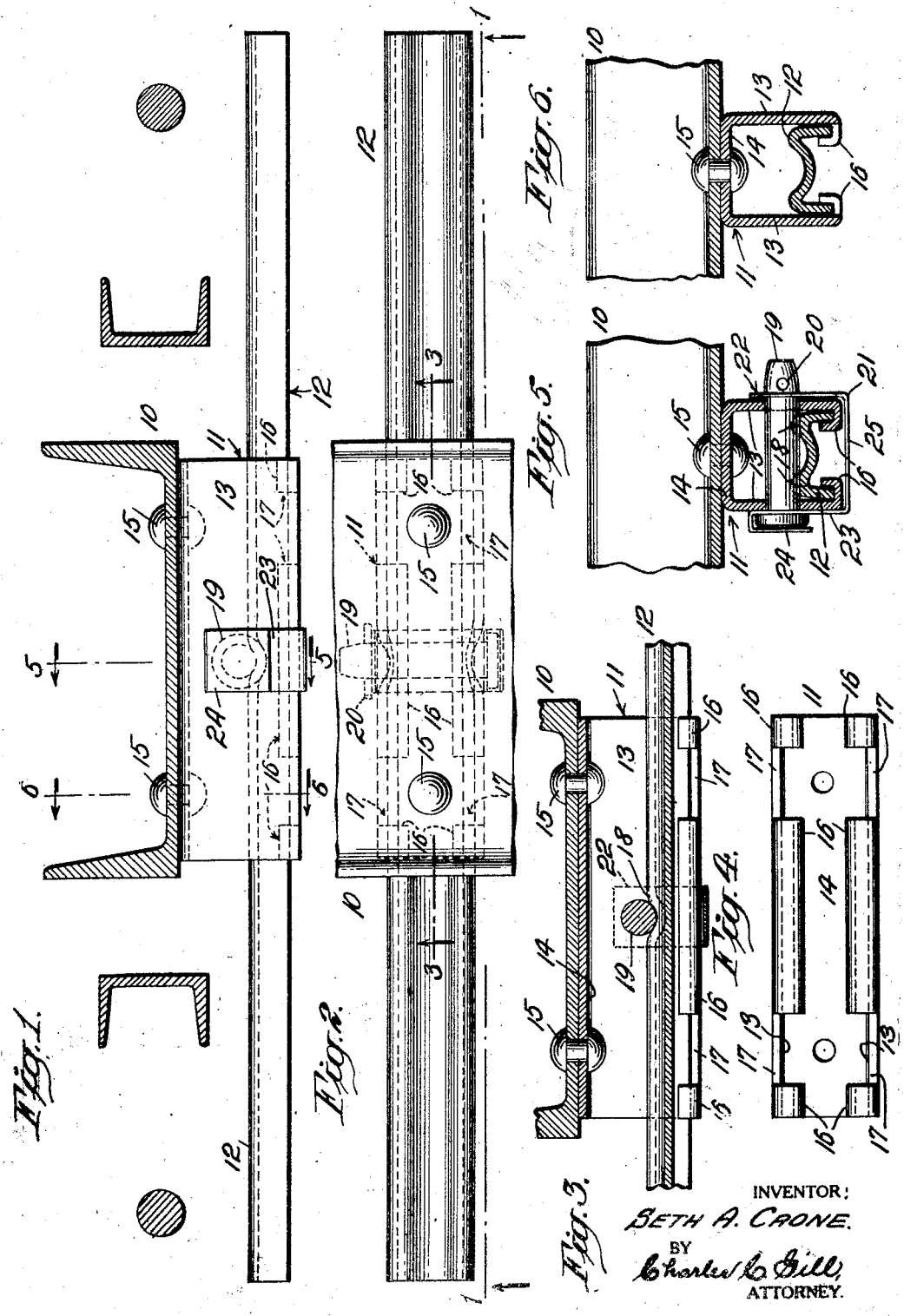
INVENTOR:
SETH A. CRONE.
BY
Charles C. Gill,
ATTORNEY.

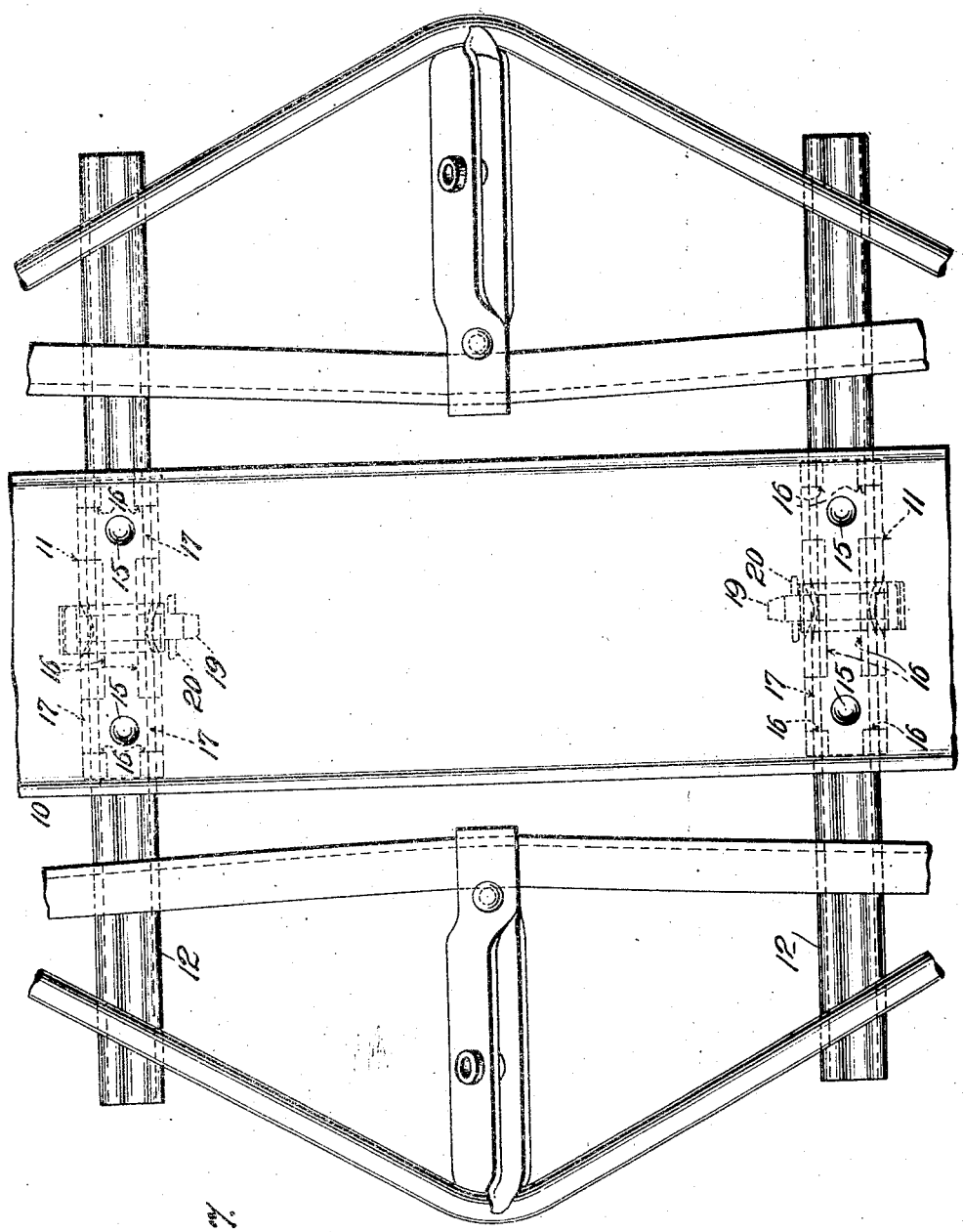

Patented Sept. 1, 1925.

1,552,047

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

EMERGENCY SAFETY SUPPORT FOR BRAKE BEAMS.

Application filed December 20, 1924. Serial No. 757,125.

*To all whom it may concern:*

Be it known that I, SETH A. CRONE, a citizen of the United States, and a resident of East Orange, in the county of Essex and State of New Jersey, have invented certain new and useful Improvements in Emergency Safety Supports for Brake Beams, of which the following is a specification.

The invention pertains to railway brake beams, and particularly to novel auxiliary or emergency supporting bars extending below and to receive the brake beams in the event that said beams should become detached from their hangings, one purpose of the invention being to prevent, in case of accident, the brake beams from falling under the wheels, derailment being thus avoided.

A further feature of the invention resides in the means I have provided for securing the auxiliary or emergency bars and suspending the same from the bottom of the usual or any suitable form of spring plank, these means being adapted to very firmly support and clamp the auxiliary or emergency safety bars, and also, when necessary, to permit the convenient removal of said bars in a speedy and convenient manner.

In carrying out my invention I secure a novel form of inverted channel-like bracket to the spring plank, and mount the emergency bar within said bracket and finally lock the bar within the bracket by means of a removable transverse pin. which extends between the sides of the bracket and engages a transverse recess in the top of the bar, said pin, when in position, preventing the bar from having endwise movement and binding the bar down against said bracket.

The invention will be fully understood from the detailed description hereinafter presented, reference being had to the accompanying drawings, in which:

Fig. 1 is a vertical longitudinal section through a portion of a car truck equipped with the features of my invention, the section being on the dotted line 1—1 of Fig. 2;

Fig. 2 is a top view, partly broken away, of the same;

Fig. 3 is a longitudinal section, partly broken away, through a portion of the same taken on the dotted line 3—3 of Fig. 2;

Fig. 4 is a bottom view of the channel-support which I secure to the spring plank and within which I mount the emergency bar;

Fig. 5 is a vertical transverse section through a portion of the car truck taken on the dotted line 5—5 of Fig. 1;

Fig. 6 is a like view, the section being taken on the dotted line 6—6 of Fig. 1, and Fig. 7 is a top view, partly broken away of a car truck showing the auxiliary or emergency supporting bars positioned below the end portions of the brake beams, at each side of the truck.

In the drawings 10 designates a conventional form of spring plank, 11 the channel-like supporting bracket and 12 the auxiliary or emergency bar held in said support or bracket, it being understood that there is a bracket 11 and an auxiliary or emergency bar 12 at each side of the truck as shown in Fig. 7, these bars being below the end portions of the inside hung brake beams with which car trucks are usually provided.

The bracket or support 11 is of wrought metal and represents an inverted channel of suitable width to receive between its side-members 13, the bar 12. The top 14 of the supporting bracket 11 may be secured by rivets 15 against the bottom of the spring plank 10. The lower edges of the sides 13 of the bracket or support 11 are at suitable points flanged inwardly and turned upwardly, as at 16, thereby forming shoulders and grooves to receive the lower side edges of the bar 12, which is also preferably of inverted channel shape. It is not necessary that the flanges 16 extend the entire length of the lower side edges of the bracket or support 11, and hence at points 17 I have cut away portions of the sides of the channel, leaving elongated inwardly flanged portions 16 at the middle of the lower side edges of the bracket or support and shorter flange members 16 at the end portions of said bracket or support. It will be understood quite readily that the bar 12 may be slid into and from the bracket or support 11 and that when said bar is in position it will be efficiently supported by the inwardly turned flange members 16, which not only support the bar 12, but serve to efficiently guide said bar during the insertion of the same into and its withdrawal from the bracket or support 11.

It is necessary that the bar 12 be locked in position within the bracket or support 11 and to that end I transversely depress or recess the top of the bar 12, as at 18, and introduce a pin 19 through close fitting holes in the sides 13 of the bracket or support and through the recesses 18 of the bar 12, this pin 19 serving by its engagement with the depressed portions or recesses 18 of the bar 12 to lock said bar against endwise movement. The pin 19 is removable, and hence, when desired, the pin may be withdrawn for permitting the removal of the bar 12. The pin 19 has a drive fit against the bar 12 and will preferably be equipped with a cotter key or the like 20 for securing it in place. I also preferably provide means for locking the pin 19 against accidental loss should the cotter key 20 be absent or become broken, and these means comprise a lock 21 formed of sheet metal and having a member 22 at one side of the bracket or support 11 and containing a hole through which the pin 19 passes, a corresponding member 23 lying against the other side of the bracket or support 11 and containing a hole through which the pin 19 passes, an extension 24 from the member 23 and which I bend downwardly against the head of said pin and an integral member 25 which connects the two side members 22, 23 of the lock.

The bracket 11 affords an efficient and very durable support for the safety bar 12, and said bar 12 is clamped down in position on said bracket by means of the pin 19, which as already explained may be withdrawn for permitting the removal of the bar 12 from said bracket.

The invention is not confined to any special means for securing the bracket 11 to the spring plank, nor to the specific details of the form of the bracket 11 and bar 12, nor to any special form of spring plank, the term spring plank being employed herein in a generic sense and including any of the customary structures connecting the central portions of the side frames of a car truck together.

What I claim as my invention and desire to secure by Letters Patent, is:

1. In a car-truck having a spring plank, emergency safety bars extending below and normally free of the end portions of the inside hung brake beam of the truck and means removably supporting said bars from the spring plank, comprising brackets secured to the spring plank and having parallel depending side members, portions of which are flanged inwardly to provide supports for said bars, and transverse pins extending through said side members above and engaging said bars and locking said bars down on said supports and against endwise movement.

2. In a car-truck having a spring plank, emergency safety bars extending below and normally free of the end portions of the inside hung brake-beam of the truck and means removably supporting said bars from the spring plank, comprising brackets secured to the spring plank and having parallel depending side members, portions of which are flanged inwardly to provide supports for said bars, and transverse pins extending through said side members above and engaging said bars and locking said bars down on said supports and against endwise movement, said bars having transverse recesses across their top to receive and interlock with said pins.

3. In a car-truck of the type employing inside hung brake beams and having a spring plank, an emergency safety bar extending below and normally free of the brake beams, an inverted channel bracket secured to the spring plank and having portions of its side members flanged inwardly to provide supports for said bar and a transverse pin extending through said side members and engaging the top of said bar for binding the bar down on said supports and against endwise movement.

4. In a car truck of the type employing inside hung brake beams and having a spring plank, an emergency safety bar extending below and normally free of the brake beams, an inverted channel bracket secured to the spring plank and having portions of its side members flanged inwardly and upwardly to provide supports and guiding grooves for said bar and a transverse pin extending through said side members and engaging the top of said bar for binding the bar down on said supports and against endwise movement.

5. In a car truck of the type employing inside hung brake beams and having a spring plank, an emergency safety bar extending below and normally free of the brake beams, an inverted channel bracket secured to the spring plank and having portions of its side members flanged inwardly to provide supports for said bar and a transverse pin extending through said side members and engaging the top of said bar for binding the bar down on said supports and against endwise movement, said bar being of inverted channel shape in cross section.

6. In a car truck of the type employing inside hung brake beams and having a spring plank, an emergency safety bar extending below and normally free of the brake beams, an inverted channel bracket secured to the spring plank and having portions of its side members flanged inwardly and said side members being at their transverse central portions formed with registering apertures, and a transverse pin extending through said apertures above the transverse central portion of said bar for locking the bar down on said supports and against endwise movement.

7. In a car truck of the type employing inside hung brake beams and having a spring plank, an emergency safety bar extending below and normally free of the brake beams, an inverted channel bracket secured to the spring plank and having portions of its side members flanged inwardly and said side members being at their transverse central portions formed with registering apertures, and a transverse pin extending through said apertures above the transverse central portion of said bar for locking the bar down on said supports and against endwise movement, the top of said safety bar being transversely recessed to interlock with said pin.

Signed at New York city, in the county of New York and State of New York, this 15th day of December A. D. 1924.

SETH A. CRONE.